(12) United States Patent
Gotkis

(10) Patent No.: US 6,788,050 B2
(45) Date of Patent: Sep. 7, 2004

(54) SYSTEM, METHOD AND APPARATUS FOR THIN-FILM SUBSTRATE SIGNAL SEPARATION USING EDDY CURRENT

(75) Inventor: Yehiel Gotkis, Fremont, CA (US)

(73) Assignee: Lam Research Corp., Fremont, CA (US)

( * ) Notice: Subject to any disclaimer, the term of this patent is extended or adjusted under 35 U.S.C. 154(b) by 0 days.

(21) Appl. No.: 10/328,912

(22) Filed: Dec. 23, 2002

(65) Prior Publication Data

US 2004/0119469 A1 Jun. 24, 2004

(51) Int. Cl.$^7$ .................. G01N 27/72; G01R 33/12; G01B 7/06
(52) U.S. Cl. ............. 324/239; 324/71.5; 324/226; 324/227; 702/170
(58) Field of Search .................. 451/8; 324/202, 324/207.16–207.19, 207.26, 227, 229–232, 234, 236, 239, 71.5; 216/86; 427/9, 10; 438/10, 11, 13, 17, 18; 702/170

(56) References Cited

U.S. PATENT DOCUMENTS

| | | | |
|---|---|---|---|
| 3,815,016 A | * | 6/1974 | Nix et al. ............. 324/202 |
| 4,556,845 A | | 12/1985 | Strope et al. |
| 5,473,247 A | * | 12/1995 | You et al. ............. 324/227 |
| 5,485,082 A | * | 1/1996 | Wisspeintner et al. ...... 324/202 |
| 5,559,428 A | | 9/1996 | Li et al. |
| 5,731,697 A | | 3/1998 | Li et al. |
| 5,889,401 A | | 3/1999 | Jourdain et al. |
| 6,072,313 A | | 6/2000 | Li et al. |
| 6,563,308 B2 | * | 5/2003 | Nagano et al. ......... 324/230 |

FOREIGN PATENT DOCUMENTS

EP   1 201 365   5/2002

OTHER PUBLICATIONS

United States Patent Application Publication US 2002/0053904.

* cited by examiner

Primary Examiner—N. Le
Assistant Examiner—Darrell Kinder
(74) Attorney, Agent, or Firm—Martine & Penilla, LLP

(57) ABSTRACT

A system and method for determining a component of an eddy current sensor (ECS) signal attributable to a substrate includes placing a substrate in a first position relative to an ECS at a first distance from the ECS. A first surface of the substrate can include a conductive film. A first ECS signal can be detected with the substrate in the first position. The substrate can then be inverted relative to the ECS. A second ECS signal is detected with the substrate in the second position. A difference signal is determined. The difference signal is equal to a difference between a first signal level on a calibration graph for the ECS and the second signal level.

20 Claims, 8 Drawing Sheets

SYSTEM, METHOD AND APPARATUS FOR THIN-FILM SUBSTRATE SIGNAL SEPARATION USING EDDY CURRENT

BACKGROUND OF THE INVENTION

1. Field of the Invention

The present invention relates generally to systems and methods for determining thin-film thickness in the semiconductor process and more particularly to systems and methods for differentiating an eddy current sensor signal induced by a substrate from a signal induced by a thin-film on the substrate.

2. Description of the Related Art

An ECS (eddy current sensor) detects a conductive material by generating and projecting an electromagnetic field (EMF) and detecting a change in the EMF when the conductive material (e.g., a wire, a conductive film, etc.) is placed into the space where the EMF is generated. When the conductive material is placed in the EMF, an eddy current is induced in the conductive material to compensate for the electrical field penetrating into the volume of the conductive material. The eddy current generates its own EMF, which interacts with the primary EMF resulting in a compensative change of the EMF. The change in the EMF is detected by the ECS. Through various calibration techniques an ECS a known distance from a conductor can determine certain aspects of the conductor from the effect the conductor exerts on the EMF. The amplitude of the EMF change depends on the resistance of the conductive material and the proximity of the conductive material to the ECS. By making constant some variables combined with various calibration techniques, this property of the ECS can be used to determine various aspects of the properties of the conductive material as well as its proximity to the ECS, By way of example, an ECS produces an EMF consisting of a 1 megahertz (MHz) signal. A conductive film (e.g., copper, aluminum, etc.) on a silicon substrate is passed through the EMF. The EMF induces an eddy current into the conductive film and the induced eddy current interferes with the EMF. The ECS detects an ECS signal that is a result of the interference caused by the eddy current.

FIG. 1 shows a typical ECS 110. A substrate 120 has a conductive film 130 or layer thereon and an EMF 112 emitted from the ECS 110 (not drawn to scale). Typically, the EMF 112 is considered to effectively penetrate through a conductor a depth quantity referred to as "a skin depth." A skin depth is the distance into a target (e.g., a conductor), which an EMF wave will decay to about 1/e (about 37%) of the initial value of the EMF wave. Skin depth is a function of the frequency of the EMF 112 and the conductor material type and other factors. If the conductor is the conductive film 130 and the conductive film is copper, the skin depth is about 220,000 angstrom, at 1 MHz. If the copper film 130 is thinner than the skin depth (e.g. about 5000 angstrom), then the EMF 112 will induce an eddy current in both the copper film 130 and the substrate 120.

The resulting signal that is detected by the ECS 110 includes components attributable to both an eddy current induced in the substrate 120 and an eddy current induced in the copper film 130. However, even if the conductor 130 were thicker than skin depth, the EMF does not actually stop penetrating at skin depth as at least part (e.g., about 37%) of the EMF penetrates further beyond the conductor 130 (e.g., into the substrate 120 and the environment beyond the substrate 120). In the present example, where the conductor 130 is thinner than skin depth, a large portion of the EMF penetrates into and even through the substrate 120 a penetration distance 114.

However, because the substrate 120 offers significant resistivity, a very small eddy current is induced in the substrate 120. As a result, the majority (e.g., about 90–95%) of the detected ECS signal is due to the eddy current induced into the conductor 130. Only about 5–10% of the detected ECS signal is due to the eddy current induced in the substrate 120.

Unfortunately, if the substrate 120 is a silicon substrate, the resistivity of the silicon substrate 120 can vary from edge to center due to the varying physical characteristics (e.g., crystalline structure, dopant concentration, and other physical characteristics) of the crystal from which the substrate was cut. Because the resistivity varies, the eddy current in the silicon substrate 120 can also vary a proportional amount between the center and the edge of the substrate 120.

A typical silicon substrate is identified as having an "average resistivity" value. The average resistivity value indicates that it is possible for the resistivity at the edge of the substrate 120 to be half the resistivity at the center of the substrate 120, resulting in a 100% or more variation in resistivity. By way of example, if a wafer can be labeled as having an average resistivity of 1.0 ohm/cm. A resistivity of 1.0 ohm/cm could allow a resistivity of 0.5 ohm/cm on the edge of the wafer and a resistivity of 1.5 ohm/cm or more at the center of the wafer, resulting in a variation of 300% or more between the edge and the center. Silicon substrates can also be labeled with a range of resistivity (e.g., 0.008–0.020 ohm/cm) indicating that the resistivity anywhere on the wafer will fall within the stated range. A range of 0.008–0.020 ohm/cm allows for a 250% variation in resistivity. Therefore, even if only about 5–10% of the detected ECS signal is due to the eddy current induced in the substrate 120, the 5–10% can vary widely. By way of example, between about 2% and about 6% or between about 4% and about 10%.

This variation in the detected ECS signal due to the substrate 120 makes it difficult to accurately detect the component of the detected ECS signal that is attributable to the thin conductive film 130. What is needed is a system and method for minimizing or eliminating the component of detected ECS signal resulting from the eddy current induced in the substrate.

SUMMARY OF THE INVENTION

Broadly speaking, the present invention fills these needs by providing an improved system and method of measuring an ECS signal. It should be appreciated that the present invention can be implemented in numerous ways, including as a process, an apparatus, a system, computer readable media, or a device. Several inventive embodiments of the present invention are described below.

One embodiment includes a method for determining a component of an eddy current sensor (ECS) signal attributable to a substrate. The method includes placing a substrate in a first position relative to an ECS at a first distance from the ECS. The substrate can include a conductive film on a first surface of the substrate. A first ECS signal can be detected with the substrate in the first position. The substrate can then be inverted relative to the ECS such that the substrate is in a second position relative to the ECS at a second distance from the ECS. The second distance is equal to the first distance less about a thickness of the substrate. A second ECS signal is detected with the substrate in the second position. A difference signal is determined. The difference signal is equal to a difference between a first signal level on a calibration graph for the ECS and the second signal level. The second signal level being shifted a distance about equal to the thickness of the substrate. A first substrate component of the first ECS signal is calculated. The first substrate component of the first ECS signal is equal to a product of the first distance and the difference signal, divided by the thickness of the substrate.

The conductive film has a thickness of between about 10 and about 20,000 angstroms. The conductive film is a film residue.

The ECS can be aligned with a first point in both the first position and the second position, the first point being on the first surface of the substrate.

The conductive film is juxtaposed between the substrate and the ECS in the first position.

Inverting the substrate can include moving the ECS.

Inverting the substrate can include moving the substrate.

Inverting the substrate can include adjusting the substrate an amount equal to about a thickness of the conductive film.

The method can also include calculating a second substrate component of the second ECS signal. The second substrate component of the second ECS signal is equal to a product of the second distance and the difference signal, divided by the thickness of the substrate.

The method can also include calculating a component of the first ECS signal attributable to the conductive film. The component of the first ECS signal attributable to the conductive film is equal to a difference between the first ECS signal and the first substrate component of the first ECS signal. A thickness of the conductive film can also be determined.

Another embodiment includes a method for mapping a resistivity of a substrate. The method includes determining a component of the eddy current sensor (ECS) signal attributable to the substrate relative to a first point and a second point on the surface of the substrate. A first resistivity is calculated for the first point and a second resistivity is calculated for the second point. A resistivity curve can be extrapolated from the resistivity at the first point and the second point.

Another embodiment includes a system for determining a component of an eddy current sensor (ECS) signal attributable to a substrate. The system includes an ECS oriented toward a substrate. The substrate is in a first position relative to the ECS at a first distance from the ECS. The substrate includes a conductive film on a first surface of the substrate. A substrate inverter is also included. The substrate inverter is capable of inverting the substrate relative to the ECS such that the substrate is in a second position relative to the ECS at a second distance from the ECS. The second distance is equal to the first distance less about a thickness of the substrate. A control system is coupled to the ECS. The control system includes logic that detects a first ECS signal with the substrate in the first position and logic that detects a second ECS signal with the substrate in the second position. The control system also includes logic that determines a difference signal equal to a difference between a first signal level on a calibration graph for the ECS and the second signal level. The second signal level being shifted a distance about equal to the thickness of the substrate. The control system further includes logic that calculates a first substrate component of the first ECS signal equal to a product of the first distance and the difference signal, divided by the thickness of the substrate.

The system can also include a stage for supporting the substrate in the first position and the second position. The stage can be adjustable to compensate for a thickness of the conductive film.

The substrate inverter can include an end effector that can invert the substrate. The substrate inverter includes an actuator that moves the ECS.

The ECS can also include a first ECS and a second ECS and wherein the substrate is in the first position relative to the first ECS and the substrate is in the second position relative to the second ECS. The first ECS and the second ECS are substantially aligned.

The first distance can be substantially equal to the second distance.

The first ECS and the second ECS are operated about 180 degrees out of phase.

The present invention provides for more accurate measurement and detection of conductive films on a substrate and by accurately determining the resistivity of the substrate.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

Several exemplary embodiments for an improved eddy current sensor system and improved methods of using an eddy current sensor will now be described. It will be apparent to those skilled in the art that the present invention may be practiced without some or all of the specific details set forth herein.

Accurately measuring thin conductive films (e.g., copper films) has become more important as the use of the conductive films have increased such as a layer in a semiconductor. Thin film deposition and subsequent thin film measuring is becoming very common. Semiconductor wafers are typically submitted to a chemical mechanical planarizing (CMP) at at least one point in the semiconductor manufacturing process. Very thin, conductive film residues (e.g., less than 1200 angstroms) often remain after a CMP operation. The very thin film residues must be accurately measured in both location and thickness so that the appropriate, additional CMP operation can be determined and applied to remove the residual film, without removing any excess material from below the residual film.

An accurate measurement of a conductive film requires that the component of the ECS signal that is attributable to the eddy current in the substrate must be substantially eliminated, minimized or compensated for. Various approaches for substantially eliminating, minimizing or compensating for the ECS signal that is attributable to the substrate are described herein.

Figure 1:
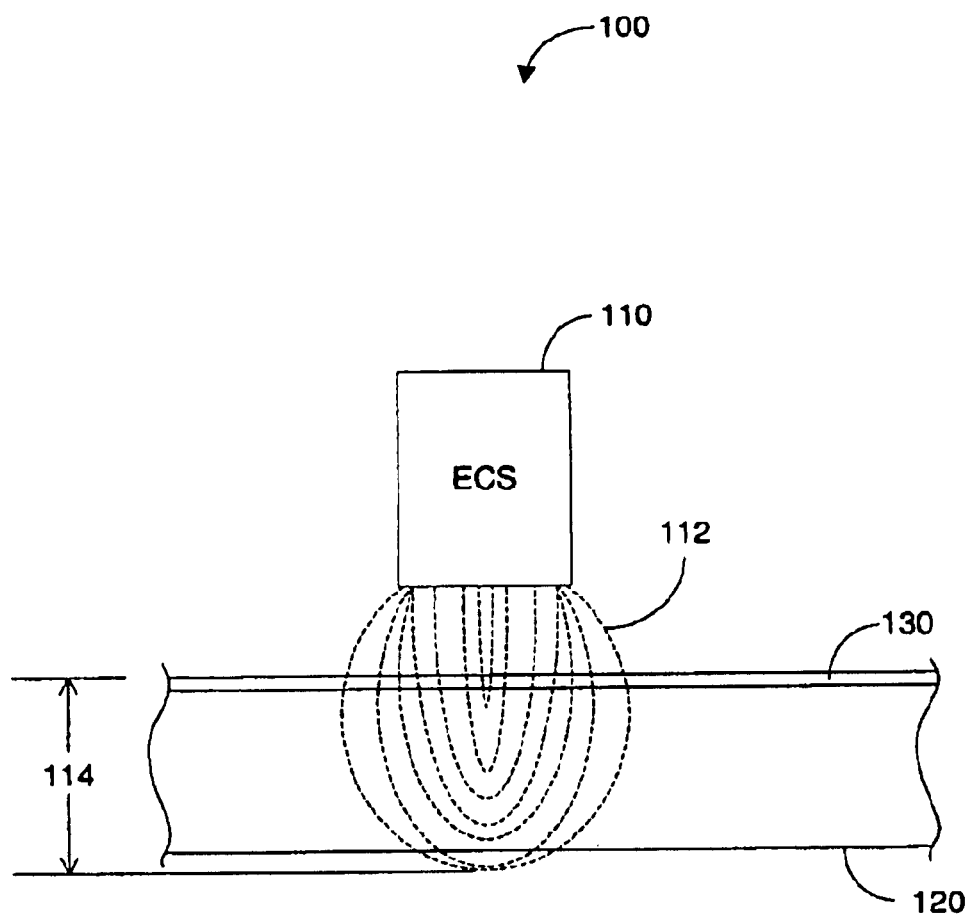
FIG. 1 shows a typical ECS.
Figure 2:
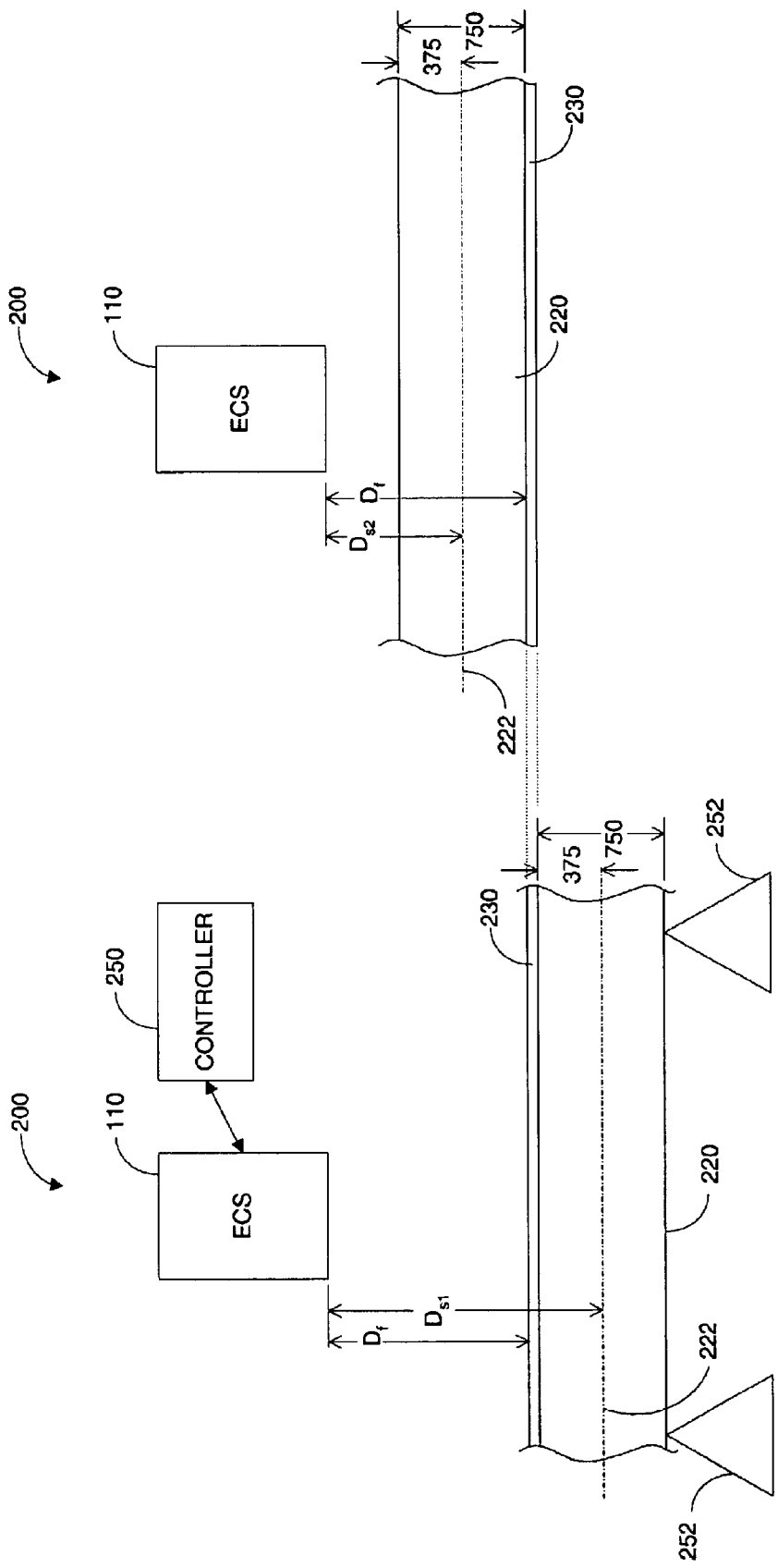
FIGS. 2A and 2B show a system for measuring the eddy current induced in a conductive film, in accordance with one embodiment of the present invention.

FIGS. 2A and 2B show a system 200 for measuring the eddy current induced in a conductive film 230, in accordance with one embodiment of the present invention. The system 200 includes an ECS 110, which is coupled to a controller 250 for controlling the ECS 110. A stage or substrate support 252 is also included for supporting the substrate 220 at a known location. An end effector or other substrate handling system could also be included for moving and inverting the substrate 220. The system 200 can also include an actuator that can move the ECS 110. Referring first to FIG. 2A, in which a semiconductor substrate 220, with the conductive film 230 thereon, is oriented in a first position, with the conductive film 230 nearest the ECS 110. The conductive film 230 can be between anywhere from a few angstroms to up to 20,000 angstroms or more. The conductive film 230 can be a very thin film residue (e.g., less than 1200 angstrom) such as what may remain after an incomplete CMP process. The semiconductor substrate 220 is typically about 750 μm (7,500,000 angstrom) in thickness. The ECS 110 is oriented a distance $D_{s1}$ from a centerline 222 of the substrate 220. Distance $D_{s1}$ is a known distance from the centerline 222. The distance $D_{s1}$ can be determined by measuring an actual distance between the surface of the film and adding 375 μm, where 375 μm is equal to one half of the typical thickness of a typical semiconductor substrate 220 of about 750 μm.

Figure 3:
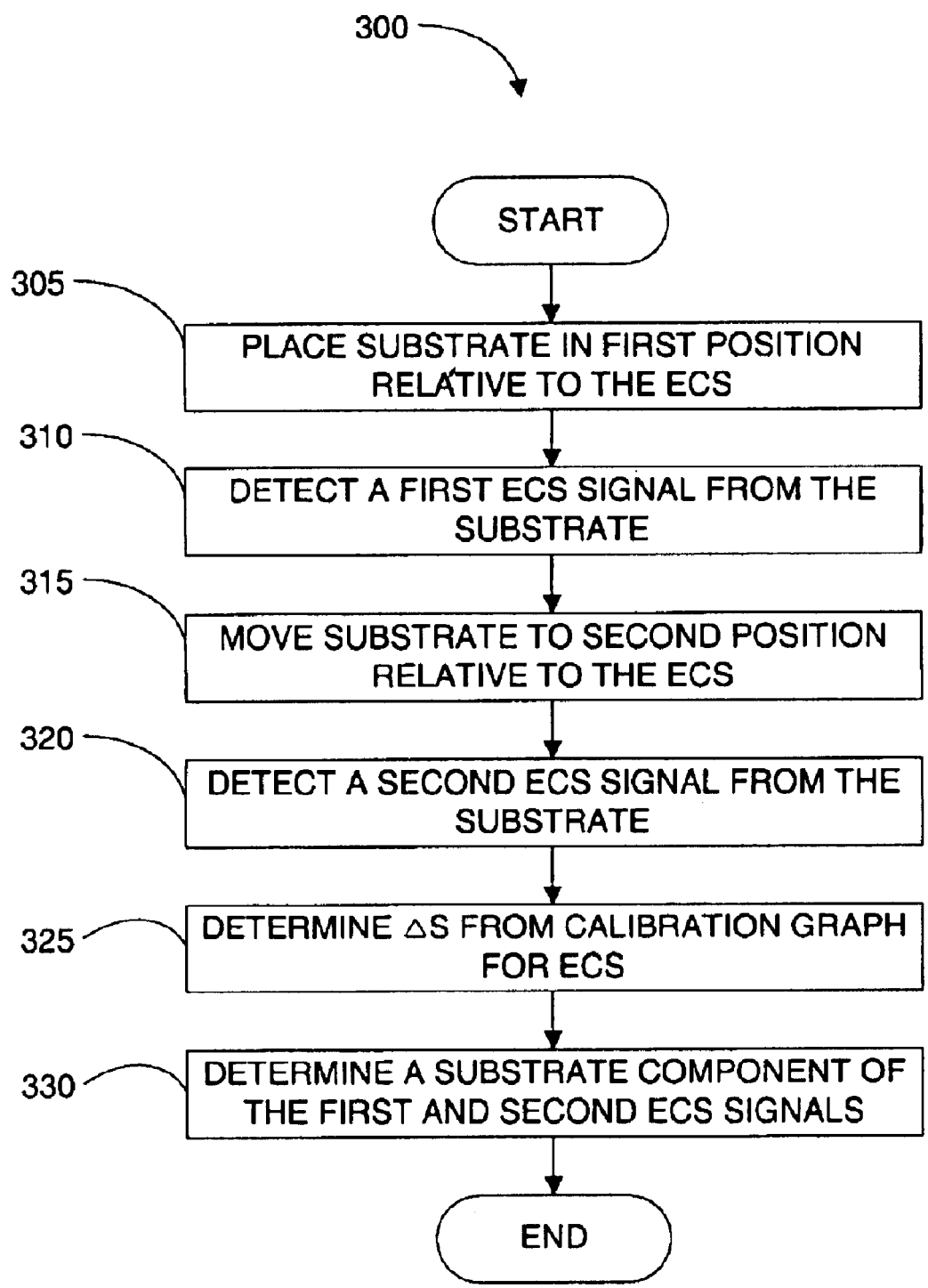
FIG. 3 is a flowchart of the method operations of determining a component of an ECS signal due to the eddy current induced into the substrate.

FIG. 3 is a flowchart of the method operations 300 of determining a component of an ECS signal due to the eddy current induced into the substrate 220. In an operation 305, the substrate 220 is placed in the first position. In operation 310, the ECS 110 induces an eddy current into the thin conductive film 230 and the substrate 220 and receives a first ECS signal $S_1$.

The first ECS signal $S_1$ is a sum of two component signals $S_{s1}$ and $S_f$. $S_{s1}$ is the component due to the eddy current induced into the substrate 220 in the first position. $S_f$ is the ECS component due to the eddy current induced into the conductive film 230.

In operation 315, the substrate 220 is moved to a second position as shown in FIG. 2B. In the second position, the conductive film 230 is in substantially the same location relative to the ECS 110 as in the first position, however, the semiconductor substrate 220 is juxtaposed between the conductive film 230 and the ECS 110. Simply put, in the second position, the substrate 220 is inverted with respect to the ECS 110, as compared to the first position. Because the conductive film 230 has some thickness (e.g., up to about 20,000 angstroms or more) simply inverting the substrate will result in the substrate being shifted toward the ECS a distance equal to a sum of the thickness of both the substrate 220 and the conductive film 230 (i.e., 750 μm+20,000 angstrom=752 μm). In one embodiment the location of the substrate 230 can be adjusted to correct for the shift (i.e. 2 μm) due to conductive film. Alternatively, the substrate 230 may not be adjusted because the component of the ECS signal attributable to the substrate 220 is only a very small portion (e.g., 5–10%) of the total ECS signal. An error in the distance $D_{s2}$ between the substrate 220 and the ECS 110 of up to 10% is tolerable as will be described in more detail below.

The conductive film 230 is in substantially the same location relative to the ECS 110 as in the first position, however, the semiconductor substrate 220 is juxtaposed between the conductive film 230 and the ECS 110. As an alternative to inverting the wafer, the ECS 110 could be moved to an opposite side of the substrate 220 such that the substrate 220 is inverted relative to the ECS 110. A distance $D_{s2}$ is the distance between the centerline 222 and the ECS 110 with the substrate 220 in the second position. The ECS 110 is also oriented in the same location relative to a point (X, Y) on the surface of the substrate 220 in both the first position and the second position.

Referring again to FIG. 3, in operation 320, the ECS 110 induces an eddy current into the conductive film 230 and the substrate 220 and receives a second ECS signal $S_2$. The second ECS signal $S_2$ is a sum of two component signals $S_{s2}$ and $S_f$. $S_{s2}$ is the ECS component due to the eddy current induced into the substrate 220 in the second position. $S_f$ is the ECS component due to the eddy current induced into the thin conductive film 230.

$S_{s1}$ and $S_{s2}$ are different because the ECS signal is a function of the distance $D_{s2}$ between the ECS 110 and the substrate 220. Distance $D_{s2}$ is less than the distance $D_{s1}$. The difference between the $D_{s1}$ and $D_{s2}$ is equal to about the thickness of the substrate 220 (i.e., about 750 μm). Conversely, a distance $D_f$, between the conductive film 230 and the ECS 110 is substantially the same in both the first position and the second position so therefore $S_f$ is substantially the same in both $S_1$ and $S_2$. The following analysis:

$$S_2 - S_1 = \Delta S \text{ and } S_2 = (S_{s2} + S_f) \text{ and } S_1 = (S_{s1} + S_f)$$

therefore:

$$(S_{s2} + S_f) - (S_{s1} + S_f) = \Delta S$$

further simplifying provides:

$S_{s2} - S_{s1} = \Delta S$ which indicates that $\Delta S$ (the difference between $S_2$ and $S_1$) is a function of the difference in location of the substrate 220.

Figure 4:
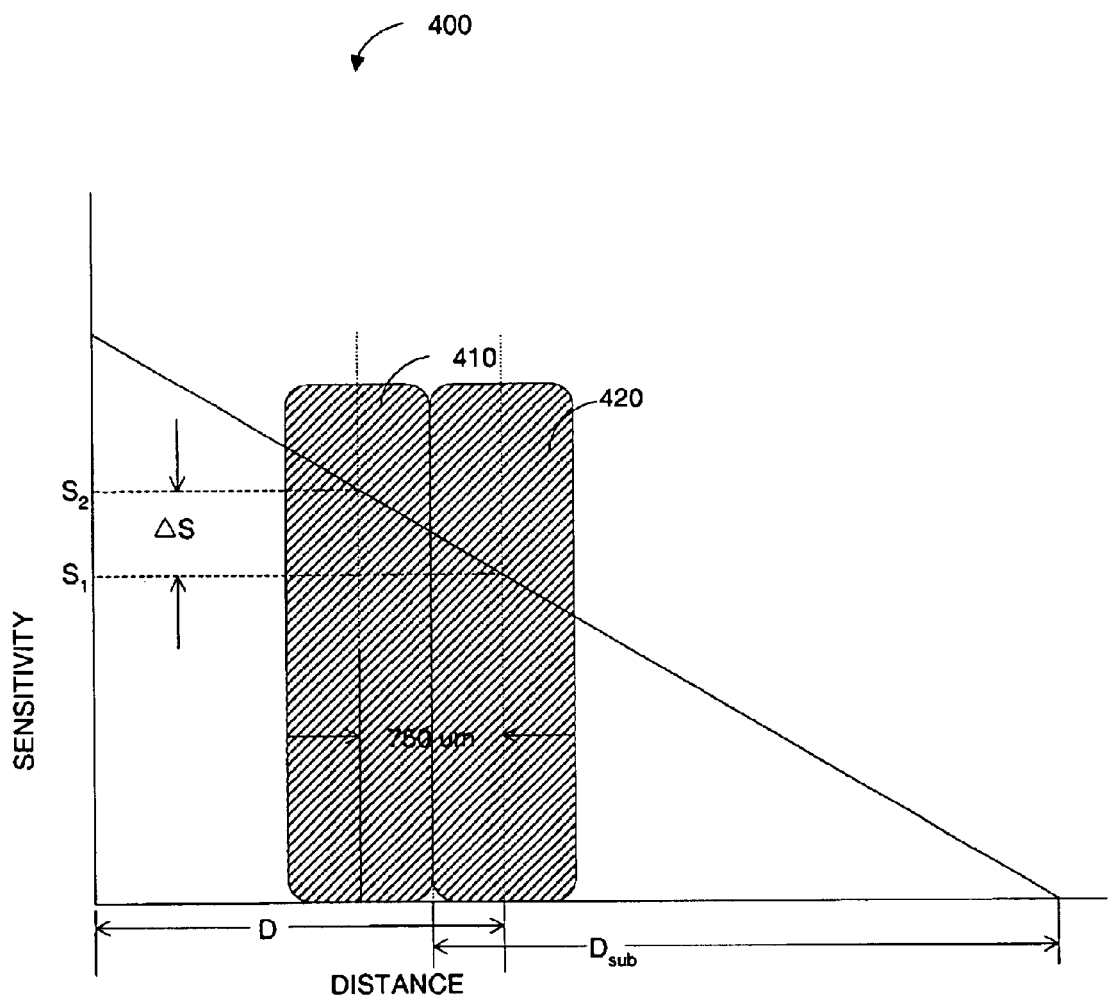
FIG. 4 shows a graph of the sensitivity of the ECS as compared to distance, in accordance with one embodiment of the present invention.

FIG. 4 shows a graph 400 of the sensitivity of the ECS 110 as compared to distance, in accordance with one embodiment of the present invention. The substrate 220 is shown in the first position 410 and then in the second position 420. In operation 325, $\Delta S$ is determined by referencing graph 400. The sensitivity of the ECS 110 is plotted on the y-axis and the distance between the ECS 110 and the detected conductor (e.g., substrate 220) is plotted on the x-axis. As the distance increases, the ECS signal approaches zero and as the distance approaches zero the ECS detects a maximum signal. The sensitivity graph 400 of the ECS is substantially linear. Therefore, if an eddy current target (e.g., conductor 230 or substrate 220) is a distance D from the ECS, then the sensitivity is equal to $S_{d1}$ as shown on the graph 400. If the eddy current target is moved 750 μm closer to the ECS 110, then sensitivity is equal to $S_{d2}$. The ΔS is a difference between $S_{d1}$ and $S_{d2}$. Because the graph 400 is linear, then any shift of 750 μm along the x-axis results in a shift in the signal strength of the ECS signal equal to ΔS (i.e., the difference between $S_{d1}$ and $S_{d2}$) and therefore ΔS a known quantity from the calibration graph 400.

In operation 330, the component of the ECS signal attributable to the substrate 220 ($ECS_{ss}$) is determined. Recall that as described in FIGS. 2A and 2B above, where the substrate 220 having a thickness of 750 μm, is moved 750 μm closer to the ECS 110 in the second position, than in the first position, then ΔS can be found on the calibration graph 400. The component of the ECS signal attributable to the substrate 220 ($ECS_{ss}$) is equal to the product of the distance D between the substrate centerline 222 and the ECS 110 and ΔS, divided by the thickness of the substrate. Stated in a mathematical relationship:

$$ECS_{ss}=(D_{sub})(\Delta S)/(\text{substrate thickness})$$

Therefore the component of the first ECS signal attributable to the substrate 220 ($S_{s1}$) is equal to the product of the distance $D_{s1}$ between the substrate centerline 222 and the ECS 110 and ΔS, divided by the thickness of the substrate. Stated in a mathematical relationship:

$$S_{s1}=(D_{s1})(\Delta S)/(\text{substrate thickness})$$

Similarly, the relationship for the second ECS signal follows:

$$S_{s2}=(D_{s2})(\Delta S)/(\text{substrate thickness})$$

A component of the first ECS signal attributable to the conductive film 230 ($S_f$) can be also be calculated. $S_f$ is equal to a difference between the first ECS signal and the first substrate component of the first ECS signal. Stated in a mathematical relationship:

$$S_f=S_1-S_{s1}$$

Once $S_f$ is determined, then the thickness of the conductive film can be accurately determined by reference to a calibration table that plots ECS signal strength versus thickness of a conductive film of the same type as the conductive film 230.

Figure 5:
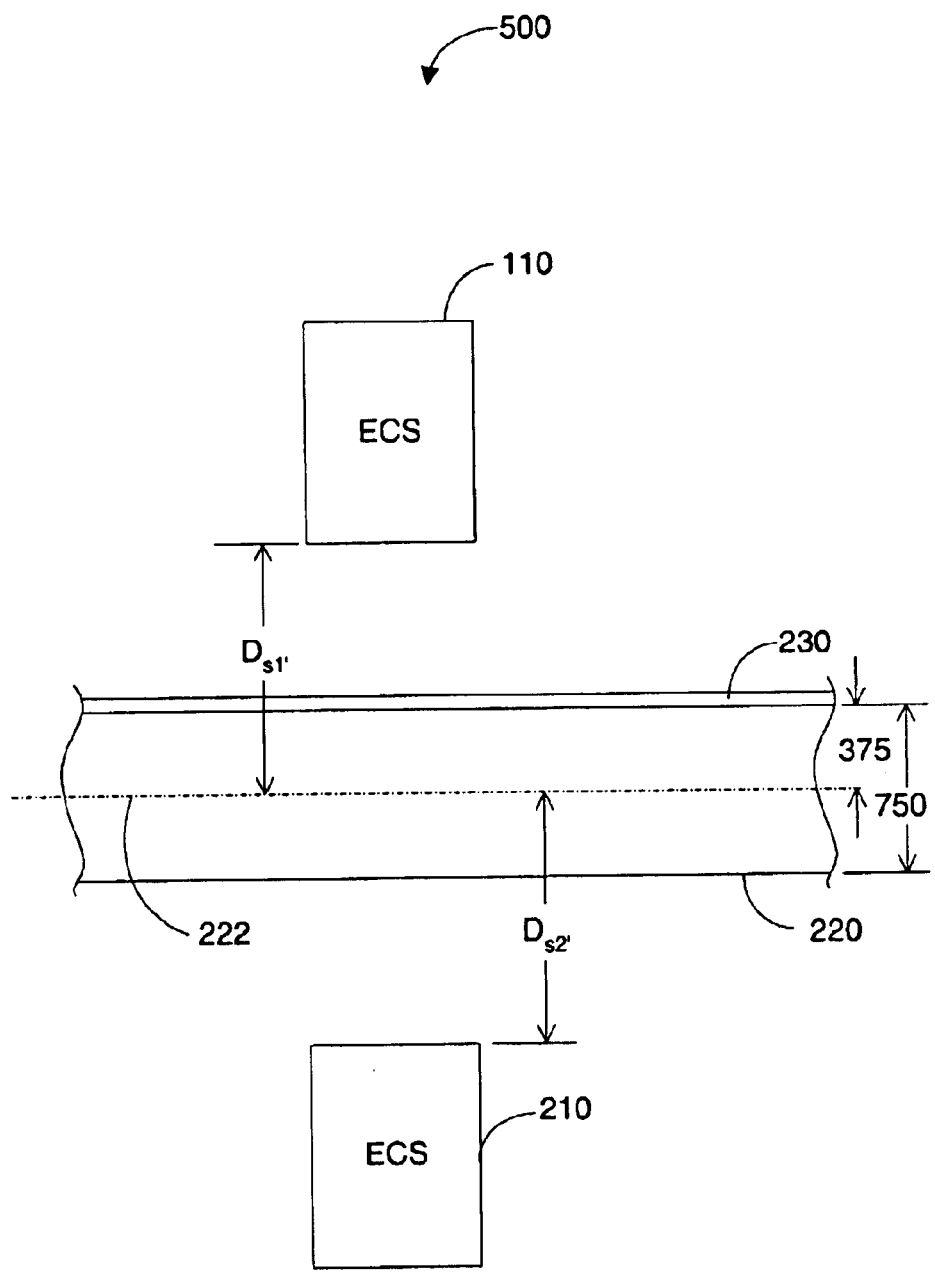
FIG. 5 is another system for determining a component of an ECS signal due to the eddy current induced into the substrate, in accordance with one embodiment of the present invention.

FIG. 5 is another system 500 for determining a component of an ECS signal due to the eddy current induced into the substrate 220, in accordance with one embodiment of the present invention. The system 500 includes two ECS 110, 210 that are on opposite sides of the substrate 220. The two ECS 110, 210 can also be at substantially the same distance (i.e., $D_{s1'}=D_{s2'}$) from the centerline 222 of the substrate 220. Alternatively, the two ECS 110, 210 can also be at substantially the different distances (i.e., $D_{s1'} \neq D_{s2'}$) from the centerline 222 of the substrate 220.

The two ECS 110, 210 are also substantially aligned with each other. Similar to as described in FIG. 3 above, the substrate 220 is in a first position relative to the first ECS 110 while simultaneously, the substrate 220 is in a second position relative to the second ECS 110. In this system 500, the first and second ECS signals can be detected in very short succession and without physically inverting either the substrate 220 or the ECS 110, 210.

The ESC 110, 210 can also be operated in a manner to increase the sensitivity of the detected ECS signals by operating the ECS 110, 210 simultaneously but 180 degrees out of phase. In this manner the first EMF from the first ECS 110 reflects the second EMF from the second ECS 210, which effectively amplifies the detected ECS signals such as described in commonly owned U.S. patent application Ser. No. 10/256,055 which was filed on Sep. 25, 2002, by Gotkis et. al and entitled "Enhancement of Eddy Current Based Measurement Capabilities," which is incorporated by reference herein for all purposes.

Figure 6:
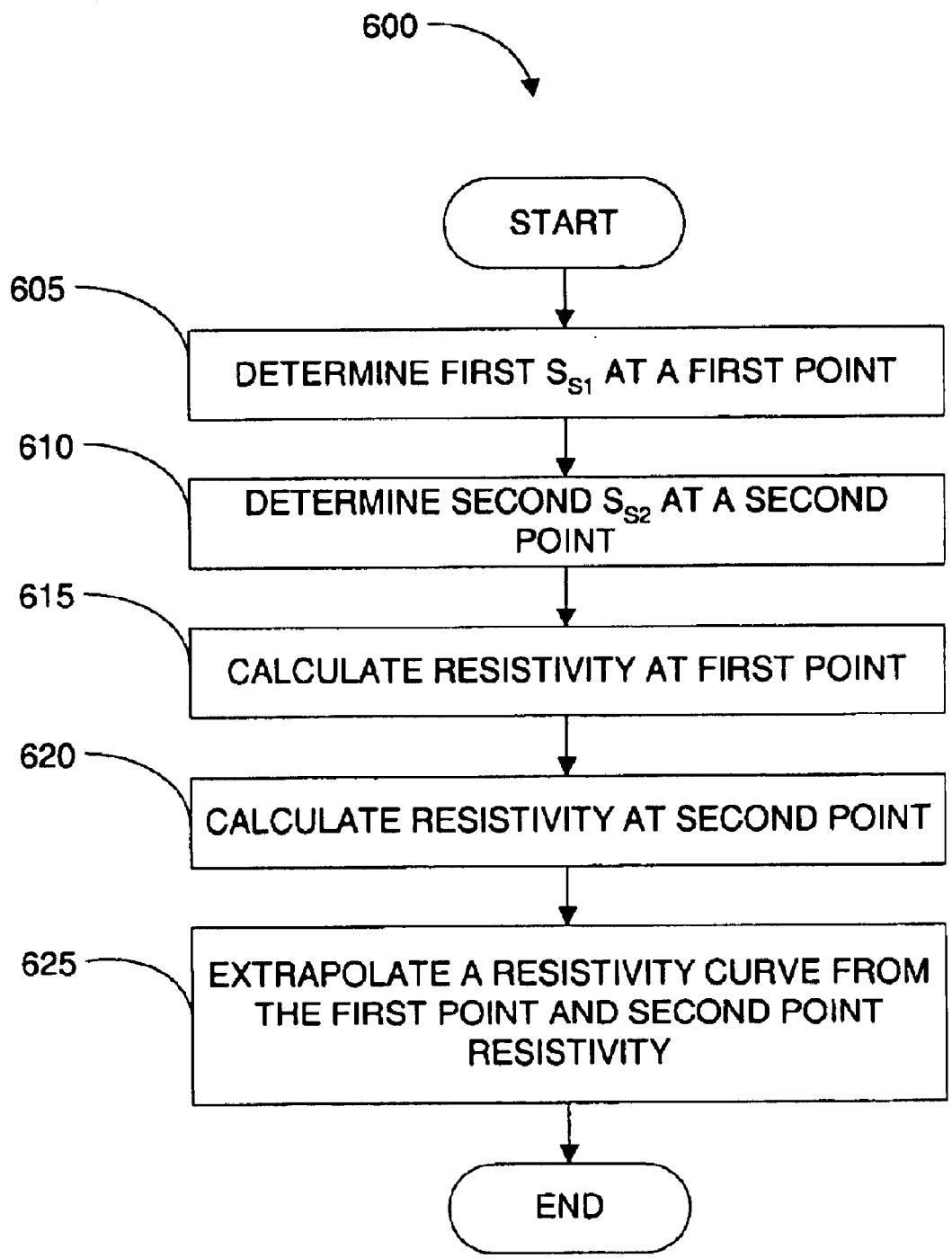
FIG. 6 is a flowchart of the method operations for mapping a resistivity of the substrate, in accordance with one embodiment of the present invention.

FIG. 6 is a flowchart of the method operations 600 for mapping a resistivity of the substrate, in accordance with one embodiment of the present invention. In an operation 605, a first component of the ECS signal attributable to the substrate 220 relative to a first point (first $S_{s1}$) on the surface of the substrate is determined as described in the above-described methods. In operation 610, a second component of the ECS signal attributable to the substrate 220 relative to a second point (second $S_{s1}$) on the surface of the substrate is determined. In operation 615, a first resistivity is calculated for the first point and in operation 620, a second resistivity is calculated for the second point. In operation 625, a resistivity curve can be extrapolated from the resistivity at the first point and the second point. As described above a typical substrate has a substantially linear resistivity measured radially. Therefore if the first point and the second point have a different radius from the center of the substrate, then the resistivity curve can be extrapolated from the two points.

Figure 7A:
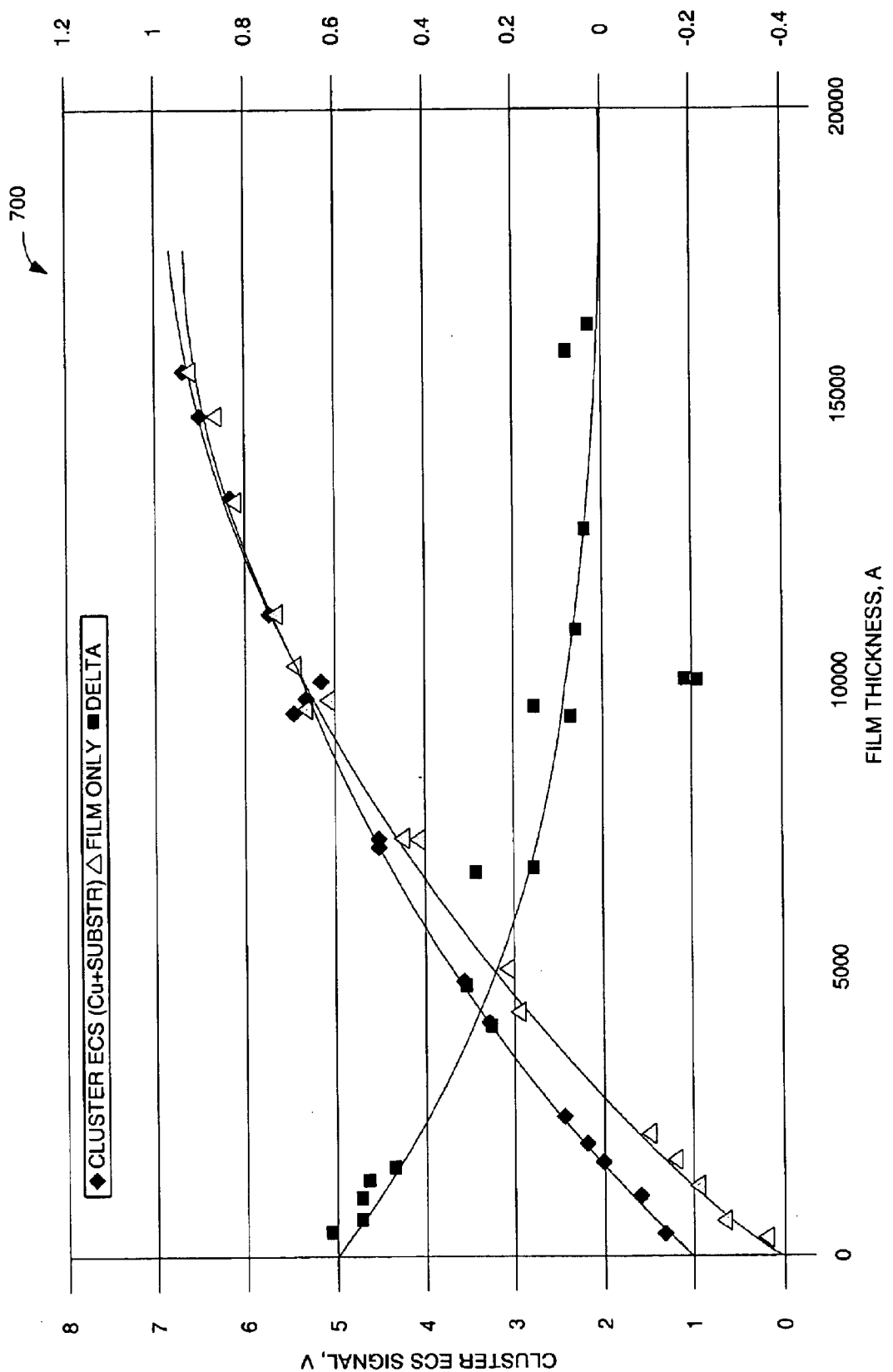
FIG. 7A is a graph of ECS signal data without correcting for the substrate contribution, in accordance with one embodiment of the present invention.
Figure 7B:
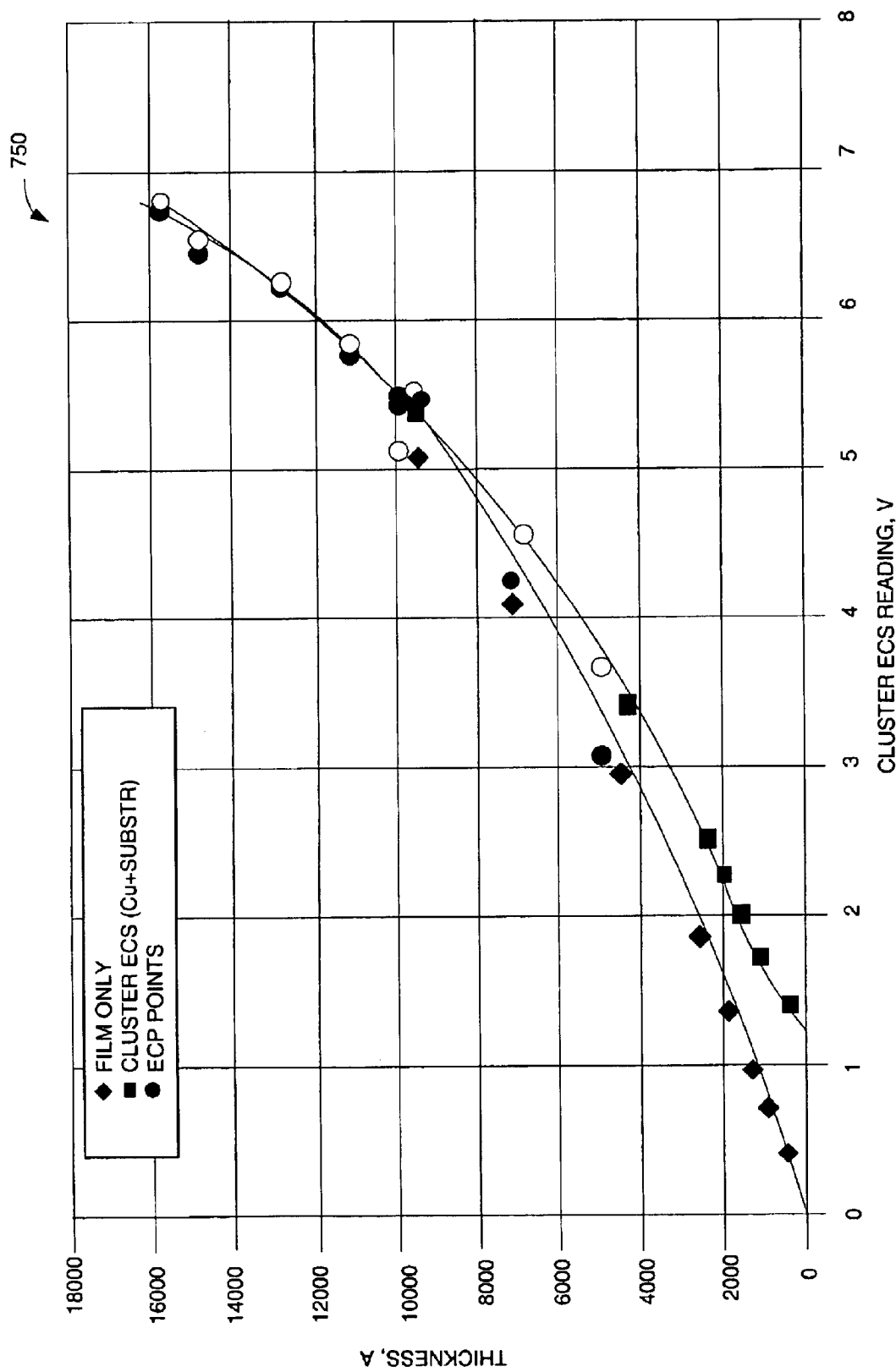
FIG. 7B is a graph of the same ECS signal data but with the substrate contribution being corrected or compensated for, in accordance with one embodiment of the present invention.

FIGS. 7A and 7B are graphs 700, 750 of ECS signals in accordance with one embodiment of the present invention. FIG. 7A is a graph 700 of ECS signal data without correcting for the substrate contribution, in accordance with one embodiment of the present invention. FIG. 7B is a graph 750 of the same ECS signal data but with the substrate contribution being corrected or compensated for, in accordance with one embodiment of the present invention. The "film only" curve 750 starts very close to 0,0 center of coordinates. As can be readily seen, identifying and compensating for the substrate contribution in an ECS signal allows for a true "thin film only" device calibration.

As used herein the term "about" means +/−10%. By way of example, the phrase "about 750 μm" indicates a range of between 675 μm and 825 μm. With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in FIGS. 3 and 6 are not required to be performed in the order illustrated, and that all the processing represented by the operations may not be necessary to practice the invention. Further, the processes described in FIGS. 3 and 6 can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for determining a component of an eddy current sensor (ECS) signal attributable to a substrate comprising:
    placing a substrate in a first position relative to an ECS at a first distance from the ECS, the substrate including a conductive film on a first surface of the substrate;
    detecting a first ECS signal with the substrate in the first position;
    inverting the substrate relative to the ECS such that the substrate is in a second position relative to the ECS at a second distance from the ECS, the second distance equal to the first distance less about a thickness of the substrate;
    detecting a second ECS signal with the substrate in the second position;
    determining a difference signal equal to a difference between a first signal level on a calibration graph for the ECS and the second signal level, the second signal level being shifted a distance about equal to the thickness of the substrate; and
    calculating a first substrate component of the first ECS signal equal to a product of the first distance and the difference signal, divided by the thickness of the substrate.

2. The method of claim 1, wherein the conductive film has a thickness of between about 10 and about 20,000 angstroms.

3. The method of claim 1, wherein the conductive film is a film residue.

4. The method of claim 1, wherein the ECS is aligned with a first point in both the first position and the second position, the first point being on the first surface of the substrate.

5. The method of claim 1, wherein the conductive film is juxtaposed between the substrate and the ECS in the first position.

6. The method of claim 1, wherein inverting the substrate includes moving the ECS.

7. The method of claim 1, wherein inverting the substrate includes moving the substrate.

8. The method of claim 1, wherein inverting the substrate includes adjusting the substrate an amount equal to about a thickness of the conductive film.

9. The method of claim 1, further comprising calculating a second substrate component of the second ECS signal equal to a product of the second distance and the difference signal, divided by the thickness of the substrate.

10. The method of claim 1, further comprising:
    calculating a component of the first ECS signal attributable to the conductive film equal to a difference between the first ECS signal and the first substrate component of the first ECS signal.

11. The method of claim 10, further comprising determining a thickness of the conductive film.

12. A method for mapping a resistivity of a substrate comprising:
    determining a component of the eddy current sensor (ECS) signal attributable to a substrate relative to a first point on the surface of the substrate including:
        placing a substrate in a first position relative to an ECS at a first distance from the ECS, the substrate including a conductive film on a first surface of the substrate;
        detecting a first ECS signal with the substrate in the first position;
        inverting the substrate relative to the ECS such that the substrate is in a second position relative to the ECS at a second distance from the ECS, the second distance equal to the first distance less about a thickness of the substrate;
        detecting a second ECS signal with the substrate in the second position;
        determining a difference signal equal to a difference between a first signal level on a calibration graph for the ECS and the second signal level, the second signal level being shifted a distance about equal to the thickness of the substrate; and
        calculating a first substrate component of the first ECS signal equal to a product of the first distance and the difference signal, divided by the thickness of the substrate;
    determining a component of the eddy current sensor (ECS) signal attributable to a substrate relative to a second point on the surface of the substrate;
    calculating a first resistivity at the first point;
    calculating a second resistivity at the second point; and
    extrapolating a resistivity curve from the resistivity at the first point and the second point.

13. A system for determining a component of an eddy current sensor (ECS) signal attributable to a substrate comprising:
    an ECS oriented toward a substrate, the substrate in a first position relative to the ECS at a first distance from the ECS, the substrate including a conductive film on a first surface of the substrate;
    a substrate inverter capable of inverting the substrate relative to the ECS such that the substrate is in a second position relative to the ECS at a second distance from the ECS, the second distance equal to the first distance less about a thickness of the substrate
    a control system coupled to the ECS, the control system including:
        logic that detects a first ECS signal with the substrate in the first position;
        logic that detects a second ECS signal with the substrate in the second position;
        logic that determines a difference signal equal to a difference between a first signal level on a calibration graph for the ECS and the second signal level, the second signal level being shifted a distance about equal to the thickness of the substrate; and logic that calculates a first substrate component of the first ECS signal equal to a product of the first distance and the difference signal, divided by the thickness of the substrate.

14. The system of claim 13, further comprising a stage for supporting the substrate in the first position and the second position.

15. The system of claim 14, wherein the stage is adjustable to compensate for a thickness of the conductive film.

16. The system of claim 13, wherein the substrate inverter includes an end effector that can invert the substrate.

17. The system of claim 13, wherein the substrate inverter includes an actuator that moves the ECS.

18. The system of claim 13, wherein the ECS includes a first ECS and a second ECS and wherein the substrate is in the first position relative to the first ECS and the substrate is in the second position relative to the second ECS, and wherein the first ECS and the second ECS are substantially aligned.

19. The system of claim 18, wherein the first distance is substantially equal to the second distance.

20. The system of claim 18, wherein the first ECS and the second ECS are operated about 180 degrees out of phase.

* * * * *